(12) United States Patent
Saita

(10) Patent No.: US 8,310,765 B2
(45) Date of Patent: Nov. 13, 2012

(54) COLOR SEPARATING OPTICAL SYSTEM

(75) Inventor: Arihiro Saita, Saitama (JP)

(73) Assignee: Fujifilm Corporation, Tokyo (JP)

(\*) Notice: Subject to any disclaimer, the term of this patent is extended or adjusted under 35 U.S.C. 154(b) by 0 days.

(21) Appl. No.: 13/187,030

(22) Filed: Jul. 20, 2011

(65) Prior Publication Data

US 2012/0050877 A1    Mar. 1, 2012

(30) Foreign Application Priority Data

Aug. 24, 2010 (JP) .................................. 2010-187215

(51) Int. Cl.
  *G02B 27/14* (2006.01)
  *G02B 27/10* (2006.01)
  *G03B 21/00* (2006.01)

(52) U.S. Cl. ........ 359/634; 359/618; 359/629; 359/640; 343/33; 343/34; 348/338

(58) Field of Classification Search .................. 359/618, 359/629, 634, 636–640; 353/20, 31, 33, 353/34, 37, 81; 600/310, 322, 323, 341
See application file for complete search history.

(56) References Cited

U.S. PATENT DOCUMENTS

| | | | | |
|---|---|---|---|---|
| 3,602,637 A | * | 8/1971 | Katsuta et al. | 348/338 |
| 3,802,763 A | * | 4/1974 | Cook et al. | 359/633 |
| 3,905,684 A | * | 9/1975 | Cook et al. | 359/633 |
| 4,268,119 A | * | 5/1981 | Hartmann | 359/634 |
| 4,427,977 A | * | 1/1984 | Carollo et al. | 345/22 |
| 6,078,429 A | * | 6/2000 | Lyon | 359/634 |
| 6,215,597 B1 | * | 4/2001 | Duncan et al. | 359/637 |
| 6,667,656 B2 | | 12/2003 | Saita | |
| 7,660,616 B1 | * | 2/2010 | Poore | 600/341 |

FOREIGN PATENT DOCUMENTS

JP    2002-365413    12/2002

\* cited by examiner

*Primary Examiner* — Loha Ben
(74) *Attorney, Agent, or Firm* — Young & Thompson

(57) ABSTRACT

A color separating optical system including first to third prisms for separating incident light from an objective lens into three primary color light components, so as to project three color-separated images of a subject onto first to third image sensors, respectively. In order to prevent ghosts from being superposed on a center area of an image frame, the color separating optical system satisfies the condition: $\alpha \approx (\beta m + \beta m + 1)/2$, wherein "$\alpha$" represents a tilt angle of a second dichroic film on the second prism to a perpendicular plane to an optical axis of the objective lens, and "$\beta m$" a diffraction angle of the second light component diffractively reflected from the second image sensor and reentering the second prism.

3 Claims, 4 Drawing Sheets

COLOR SEPARATING OPTICAL SYSTEM

BACKGROUND OF THE INVENTION

1. Field of the Invention

The present invention relates to a color separating optical system for use in a color imaging device.

2. Description of the Related Art

A popular compact digital camera generally adopts a single-panel imaging device using a single image sensor, such as a CCD or a CMOS image sensor, for capturing a full-color image. On the other hand, a high-definition digital camera is provided with a color separating optical system that separates light from the subject into three primary color light components: blue, green and red light components, so that the respective light components will be individually captured as three color-separated images by three image sensors specific for each color. Thus, a high-resolution color image of the subject is obtained from the three color-separated images. These high-definition cameras have been sold in general markets and widely used for professional applications; in photo studios, for broadcastings and in scientific fields, such as astronomical observation through satellite or the like.

A Phillips-type color separating optical system is known as a typical color separating optical system incorporated in a color imaging device. As disclosed for example in U.S. Pat. No. 6,667,656 (corresponding to Japanese Patent Laid-Open Publication No. 2002-365413), the Phillips-type color separating optical system consists of three prisms combined with dichroic films. The first prism has a blue reflecting dichroic film formed on a reflection surface, to reflect the blue light component of the incident light and transmits the red and green light components therethrough. The second prism is spaced with an air gap from the first prism, so that the red and green light components penetrating the first prism will enter the second prism. The second prism has a red reflecting dichroic film formed on a reflection surface, to reflect the red light component and transmit other light components therethrough. The third prism transmits the green light component, which has penetrated the first and second prisms, to emit the green light component from an exit surface of the third prism.

In face to each exit surface of the first to third prisms, an individual image sensor is disposed. A flux of light from the subject enters through an objective lens into the color separating optical system and is separated into blue, green and red light components which are emitted from the exit surfaces of the respective prisms. Thus, the blue, green and red light components of an optical image of the subject are individually captured by the specific image sensors. The Phillips-type color separating optical system is capable of adjusting light path lengths inside the prisms individually for each color. Also a trimming filter may be attached to the exit surface of each prism for the sake of color tone adjustment. These trimming filters have respective spectral characteristics corresponding to the color light components to be emitted from the allocated prisms. Therefore, this type color separating optical system achieves superior color separation and makes optics behind the objective lens compact.

In this type of color separating system, however, when a subject located at the center of the image frame is remarkably brighter than the background, ghosts can be superposed on the subsequent image and the ghosts will remarkably degrade the sharpness of the image. For example, when a spot light source located at the center in a dark background is directly captured, or in a scene where the sun is located at the center for the sake of enhancing the brightness of summer sunshine, or a bright planet in the night sky is located at the center, the ghost phenomenon can occur. The ghosts, which have a tinge of one of the color-separated primary colors, e.g. red, can be superposed on the center subject in the consequent image. Moreover, multiple ghosts can appear at regular intervals within an image frame. Therefore, the ghosts may be an ineligible problem in capturing a scene having a bright subject at the center.

Referring to FIGS. 4 and 5, a comparative example is illustrated for the sake of explaining the above-described ghost phenomenon. In this example, an illumination lamp is captured as a bright center subject through a known color imaging device. This color imaging device includes an objective lens 2, a color separating optical system 6 having first to third prisms 3, 4 and 5, and image sensors 7B, 7R and 7G disposed in face to exit surfaces of the first to third prisms 3 to 5, respectively. The incident light from the subject travels through the objective lens 2 into the first prism 3 along an optical axis P, and falls on a blue reflecting dichroic film formed on a surface 3a of the first prism 3. The blue reflecting dichroic film reflects the blue light component and transmits other light components of the incident light. Blue rays reflected from the blue reflecting dichroic film are totally reflected from an inner surface of an incidence surface of the first prism 3, to exit from an exit surface of the first prism 3. Then the blue rays fall on an imaging surface of the image sensor 7B. Note that when a camera containing the color separating optical system 6 is held at its normal horizontal erecting posture, the color separating optical system 6 will be oriented with its upside in the drawings upward in the field. Accordingly, both the optical axis P of the incident light and the optical axis of the reflected light from the blue reflecting dichroic film will be included in a vertical plane.

An incidence surface of the second prism 4 is opposed to the surface 3a of the first prism 3 with a predetermined air gap S. The second prism 4 has a red reflecting dichroic film formed on a surface 4a. The red reflecting dichroic film reflects the red light component and transmits other light components of the incident light. The red light component reflected from the red reflecting dichroic film is totally reflected from the inner surface of the incidence surface of the second prism 4 and then falls on an imaging surface of the image sensor 7R through an exit surface of the second prism 4. The green light component entering through the incidence surface of the first prism 3 will penetrate through the blue and red reflecting dichroic films and then through the third prism 5, to fall on an imaging surface of the image sensor 7G. The back focus of the objective lens 2 is decided taking account of light path lengths of the respective colors inside the first to third prisms 3 to 5, such that blue, red and green images are formed on the imaging surfaces of the image sensors 7B, 7R and 7G, respectively.

Focusing now on the imaging surface of the image sensor 7R, the red image of the illumination lamp or the center subject is formed in a center area of the imaging surface, and is read as an image signal into the image sensor 7R. Generally, the imaging surface of the image sensor has a micro structure or pattern of indents around individual sensor pixels, regardless of whether it is of CCD type or CMOS type, and the micro structure is made of a relatively-high reflectance material, such as a metal coating. In addition, the micro patterns have a periodic structure corresponding to the sensor pixel array. In the case where a ½-inch or ⅔-inch image sensor has more than 1.5 to 2 mega pixels, the interval between the sensor pixels, which may be called pixel pitch or dot pitch, will be in the order of several microns. Then the micro structure of relatively-high reflectance will behave as a reflective diffraction grating.

As a result, the red rays will be diffractively reflected from the imaging surface of the image sensor 7R toward the exit surface of the second prism 4, and reenter the second prism 4 at diffraction angles that are determined by the wavelengths of the red rays and the pixel pitch. Thereafter the red rays are totally reflected from the incidence surface of the second prism 4 and then fall on the red reflecting dichroic film. Most of the returned red rays are reflected again from the red reflecting dichroic film, and totally reflected from the incidence surface of the second prism 4, and then fall again on the imaging surface of the image sensor 7R through the exit surface of the second prism 4.

The light path of those red rays X being diffractively reflected from the imaging surface of the image sensor 7R and coming back to this imaging surface may be illustrated as shown by dashed lines df1 to df4 in FIG. 5, wherein the second prism 4 is virtually developed relative to the image sensor 7R, as shown by phantom lines, in such a manner that the light paths of the diffracted red rays X after the reentry into the second prism 4 may be shown as straight lines. Generally, the first to third prisms 3 to 5 are made of the same glass material. Assuming that "n" represents a refraction index of the glass material, "λ" a reference wavelength of the red rays, "d" an interval of the indent pattern between the pixels on the imaging surface of the image sensor 7R, and "βm" a diffraction angle of a diffracted beam relative to a perpendicular red light axis Pr to the imaging surface of the image sensor 7R, "m" a natural number (including zero) representative of an order of diffraction, these parameters may be expressed by the following equation:

$$d \cdot n \cdot \sin(\beta m) = m \cdot \lambda.$$

For example, when the refraction index "n" is 1.551, the reference wavelength "λ" of the red rays is 0.61 μm, the interval "d" of the indent pattern on the image sensor 7R is 5 μm, respective diffraction angles "β1", "β2", "β3" and "β4" of first to fourth-order diffraction rays df1, df2, df3 and df4 relative to the red light axis Pr (identical to zero-order diffraction ray) will be 4.51°, 9.05°, 13.65° and 18.34°, respectively. Note that "α" in the drawings represents a tilt angle of the red reflection dichroic film to a perpendicular plane to the optical axis P. In the example shown in FIG. 5, the angle "α" is 13.25°.

As seen from FIG. 5, a virtual red light axis Prx representative of the red light axis Pr in the developed view of the second prism 4, of course, intersects with the image sensor 7R at the center of a virtual imaging surface 7Rx in the developed view. In addition, the third-order diffraction rays df3, which have been enhanced by the diffraction, will fall on the center of the imaging surface 7Rx, and form a ghost G3 overlapping on a center subject A1 in an image frame 10, as shown in FIG. 4. Since the indent pattern on the imaging surface of the image sensor 7R forms a matrix grating, the third-order diffraction rays df3 will form multiple ghosts G3 on the right and left sides of the center subject A1 within the image frame 10, and the second-order diffraction rays df2 and the fourth-order diffraction rays df4 will form multiple ghosts G2 and G4 above and below the image frame 10, respectively. This ghost pattern, particularly the ghost G3 formed on the center area of the image frame 10 by the third-order diffraction ray df3, will remarkably degrade the image quality, especially in a scene where a bright main subject is located at the center in a dark background.

SUMMARY OF THE INVENTION

An object of the present invention is to solve the above problem and provide a prism-type color separating optical system for a color imaging device, which prevents the ghosts from overlapping on a center subject in an image frame especially in a scene where the center subject is bright and the background is dark.

To achieve the above and other objects, the present invention focuses on the fact that the ghosts will appear in a pattern that depends on the wavelengths of the incident light components and the pixel pitch on the imaging surface of the image sensor.

A color separating optical system of the present invention includes first to third prisms as basic components. The first prism has an incidence surface that is perpendicular to an optical axis of an objective lens, and has a first dichroic film formed on a surface. Among the incident light entering through the first incidence surface of the first prism, the first dichroic film reflects a first color light component therefrom and transmits second and third color light components therethrough, and the first color light component reflected from the first dichroic film is emitted from the first prism to a first image sensor. The second prism has an incidence surface accepting the light components as transmitted through the first dichroic film, and a second dichroic film formed on a surface. The second dichroic film reflects the second color light component therefrom and transmits the third color light component therethrough. The second color light component reflected from the second dichroic film is totally and internally reflected within the second prism and then emitted from the second prism to a second image sensor. The third color light component transmitted through the second dichroic film is emitted from the third prism to a third image sensor.

On the basis of the above structure, the color separating optical system of the present invention is characterized by satisfying the condition: $\alpha \approx (\beta m + \beta m + 1)/2$, provided that α represents a tilt angle of the second dichroic film to a perpendicular plane to the optical axis of the objective lens, and βm represents a diffraction angle of the second color light component diffractively reflected from the imaging surface of the second image sensor, on the assumption that the diffraction angle βm satisfies the following equation: $d \cdot n \cdot \sin(\beta m) = m \cdot \lambda$, wherein λ represents a reference wavelength of the second color light component, d represents a pixel pitch of the second image sensor, n represents a refraction index of the second prism, and m is a natural number representative of an order of diffraction.

Preferably, the first color light component is one of blue and red light components; whereas the second color light component is the other of the blue and red light components. In addition, it is preferable to provide an air gap between the first surface of the first prism having the first dichroic film formed thereon and the incidence surface of the second prism, in order to make the critical angle of the total reflection inside the second prism smaller.

According to the present invention, an imaging device using a Phillip-type color separating optical system that is superior in color separation effect can capture a sharp image without any ghost superposed on a center main subject even when the center subject is bright and the background is dark.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DETAILED DESCRIPTION OF THE PREFERRED EMBODIMENTS

Figure 1:
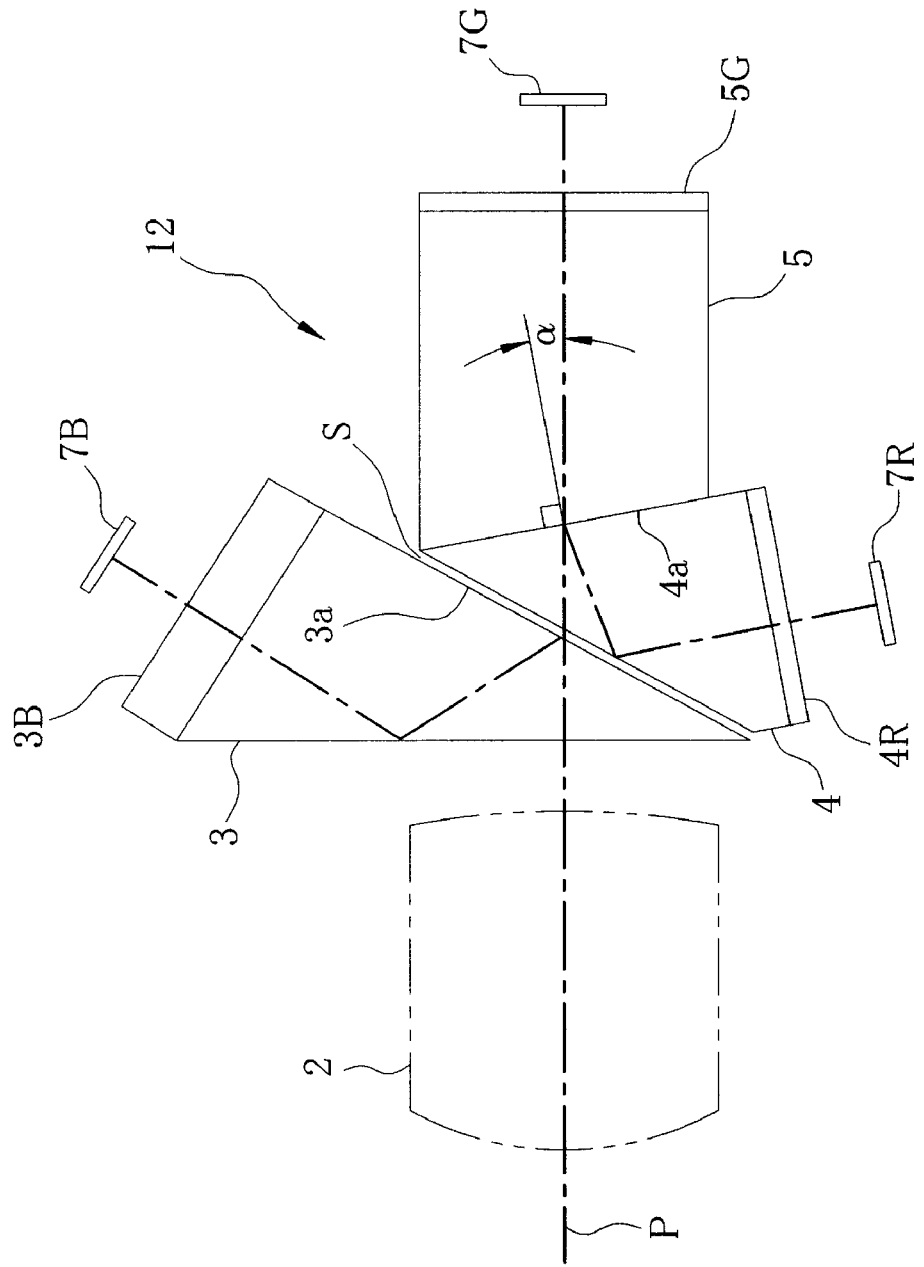
FIG. 1 is a conceptual diagram illustrating a color imaging device using a color separating optical system of the present invention.

As shown in FIG. 1, a color imaging device using a color separating optical system of the present invention includes an objective lens 2, the color separating optical system 12, and individual image sensors 7B, 7R and 7G for three primary color light components of subject light: blue, red and green light components. In one embodiment, the image sensors 7B, 7R and 7G may be of a ⅔-inch monochrome type, having 2.5 M pixels with a pixel pitch of 5 μm.

The color separating optical system 12 separates the subject light from the objective lens 2 into blue, red and green light components, and forms a blue image, a red image and a green image on imaging surfaces of the image sensors 7B, 7R and 7G, respectively. An infrared cut filter (not shown) is disposed in front of each image sensor 7B, 7R, 7G or in between the objective lens 2 and the color separating optical system 12, so that infrared rays unnecessary for color-imaging are blocked from the imaging surfaces. Thus, the image sensors 7B, 7R and 7G respectively output image signals of three primary color light components necessary for reproducing a full-color image. Note that the color separating optical system 12 is normally used in a posture where its upside in the drawings is oriented upward in the field, like the conventional optical system 6 in FIG. 5. Equivalent components of the color separating optical system 12 to those of the color separating optical system 6 are designated by the same reference numerals as used in FIG. 5.

The color separating optical system 12 consists of first to third prisms 3, 4 and 5 made of a common glass material that has a refraction index of 1.551, for example. An incidence surface of the first prism 3 is perpendicular to an optical axis P of the objective lens 2, and has a first dichroic film formed on a surface 3a crossing the optical axis P at a certain angle. The first dichroic film reflects a first color light component of the incident light, e.g., blue rays in a wavelength range of 400 nm to 480 nm, and transmits other light components. The blue rays reflected from the first dichroic film are totally reflected from the inner surface of the incidence surface of the first prism 3. Then, the blue rays travel through a trimming filter 3B, which is attached to an exit surface of the first prism 3, and fall on the image sensor 7B. The surface 3a having the first dichroic film formed thereon tilts to a perpendicular plane to the optical axis P at an angle that is so determined that the reflected blue rays from the first dichroic film fall on the inner surface of the incidence surface of the first prism 3 at an incident angle larger than the critical angle. Generally, the tilt angle of the first dichroic film ranges from 20° to 30°.

An incidence surface of the second prism 4 is opposed to the surface 3a of the first prism 3 with a predetermined air gap S from each other. The light components transmitted through the first dichroic film enter the second prism 4 and travel to a second dichroic film that is formed on a joint surface 4a to the third prism 5. Note that the second dichroic film may be formed on an incidence surface of the third prism 5, i.e., a joint surface of the third prism 5 to the second prism 4. The second dichroic film has such spectral characteristics that it reflects a second color light component, e.g., red rays in a wavelength range of 570 nm to 700 nm, and transmits other light components among those transmitted through the first dichroic film. The red rays reflected from the second dichroic film travel through a trimming filter 4R, which is attached to an exit surface of the second prism 4, and fall on the image sensor 7R.

According to the spectral characteristics of the second dichroic film and the trimming filter 4R, the red rays incident on the image sensor 7R are substantially included in the wavelength range of 570 nm to 700 nm, and a value representative of this wavelength range is determined to be a reference wavelength λ. For example, the reference wavelength λ may be a center wavelength of the above-mentioned wavelength range, a peak wavelength in the spectral characteristics of the second dichroic film, a wavelength to which the image sensor 7R is most sensitive, or a value that is decided considering all of these wavelengths. In the present embodiment, the reference wavelength for the red rays is determined to be 610 nm. A reference wavelength for the blue rays and a reference wavelength for green rays as set forth below may be determined in the same manner.

The second dichroic film also tilts to the perpendicular plane to the optical axis P at an angle α that is so determined that the reflected red rays from the second dichroic film fall on the inner surface of the incidence surface of the second prism 4 at an incident angle larger than the critical angle. Generally, the tilt angle of the second dichroic film is set smaller than the tilt angle of the first dichroic film. In the present embodiment, the tilt angle of the second dichroic film is set at 11.35°, considering that the pitch of the pixels on the imaging device or image sensor 7R is 5 μm, that the refractive index of the glass material of the second prism 4 is 1.551, and that the reference wavelength of the red rays is 610 nm.

The light components transmitted through the second dichroic film enter the third prism 5 and fall on an imaging surface of the image sensor 7G through a trimming filter 5G that is attached to an exit surface of the third prism 5. Like other trimming filters 3B and 4R, the trimming filter 5G limits the wavelength range of as the third color light component that finally falls on the image sensor 7G, for example, to 490 nm to 560 nm.

Through the color separating optical system 12 configured as above, blue, red and green optical images of the subject are respectively formed on the image sensors 7B, 7R and 7G. Moreover, the color separating optical system 12 can avoid the problem of getting ghosts superposed on a center subject even when the center subject is bright and the background is dark, as set forth in detail below.

Figure 2:
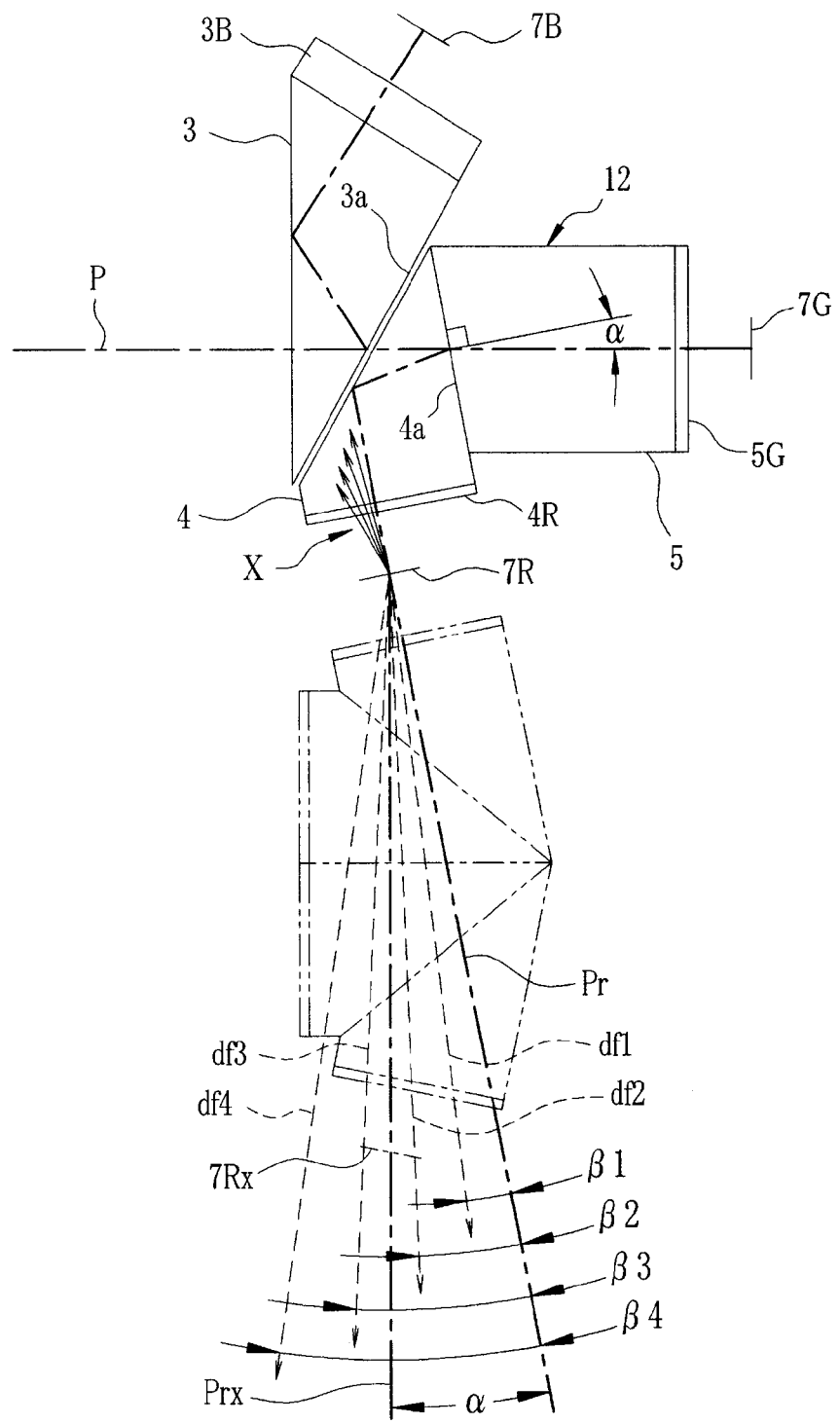
FIG. 2 is an explanatory diagram illustrating the operation of the color separating optical system of the present invention.
Figure 3:
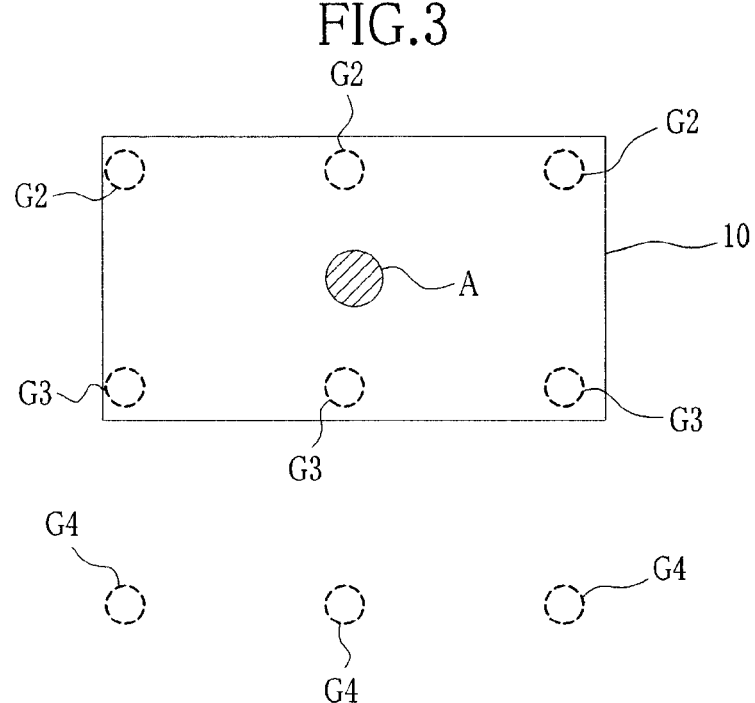
FIG. 3 is a schematic diagram illustrating a ghost pattern provided by the color separating optical system of the present invention.
Figure 4:
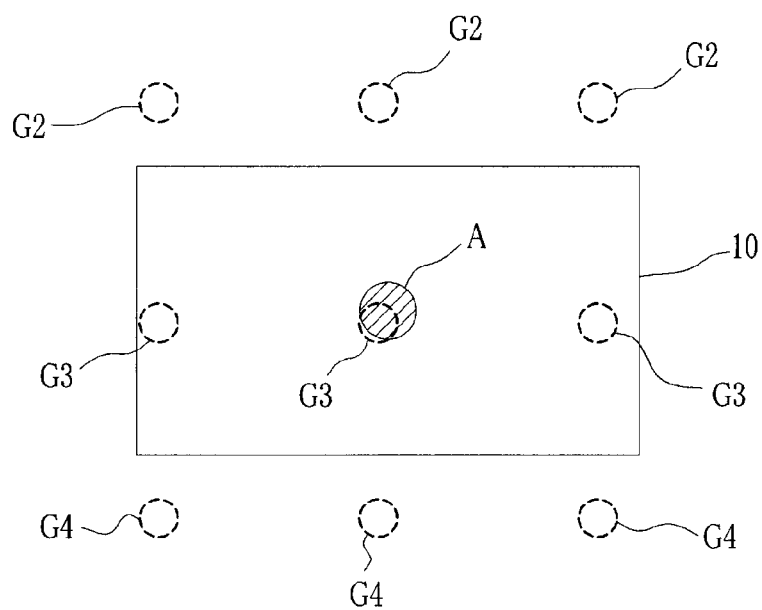
FIG. 4 is a schematic diagram illustrating a ghost pattern provided by a conventional color separating optical system.
Figure 5:
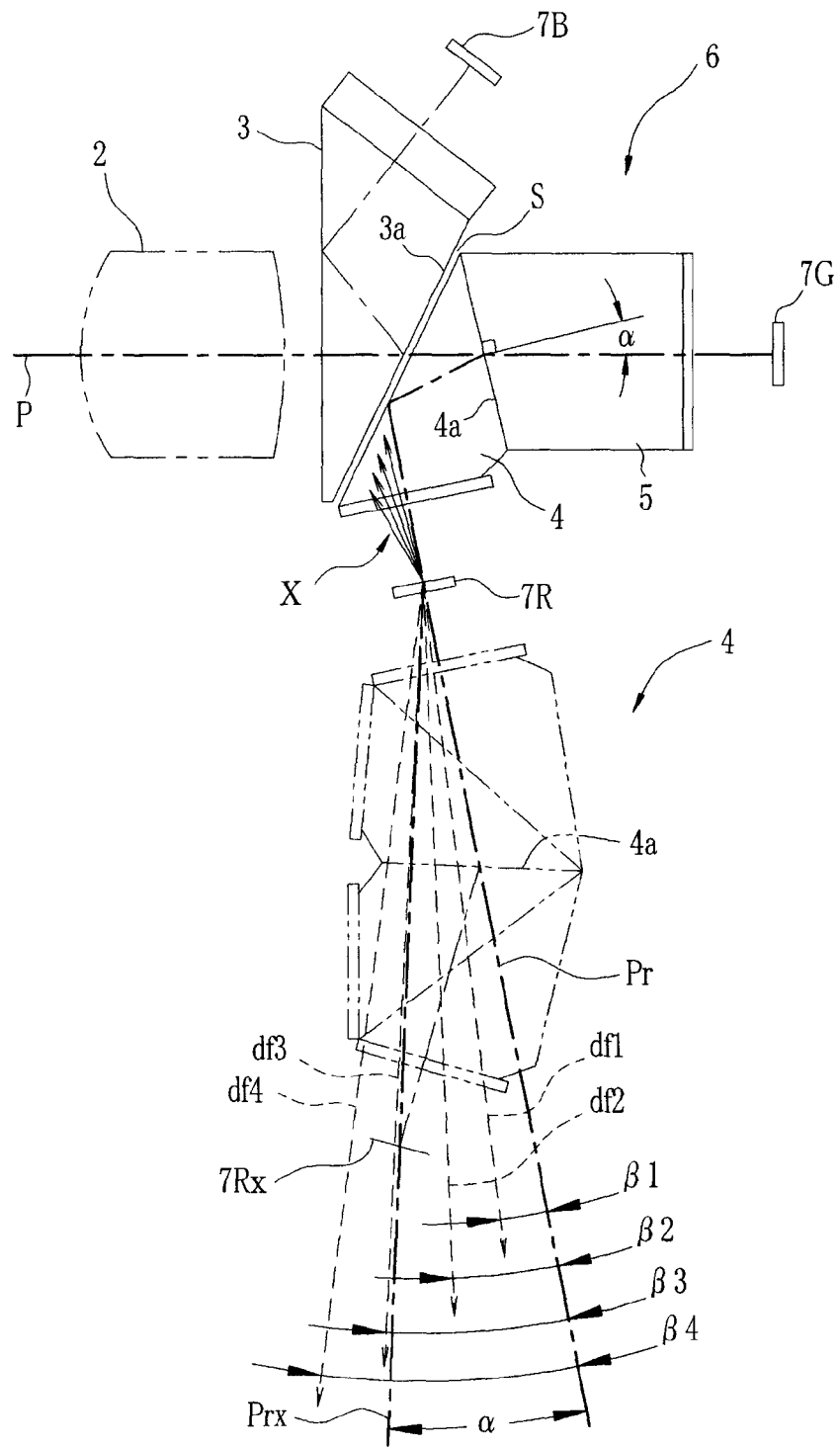
FIG. 5 is an explanatory diagram illustrating the operation of the conventional color separating optical system.

Referring to FIG. 2, the second prism 4 of the color separating optical system 12 is illustrated in a developed manner like the second prism 4 of the prior art system 6 in FIG. 5, so as to clarify the light paths of the diffracted red rays from the imaging surface of the image sensor 7R, especially those after the reentry into the exit surface of the second prism 4. As seen from FIG. 2, the second-order diffraction ray df2 and the third-order diffraction ray df3 fall on the image sensor surface 7Rx but outside a center area thereof. As shown in FIG. 3, the ghost pattern will totally shift in the vertical direction of the image frame 10 relative to the position shown in FIG. 4, so that the ghosts G3 resulted from the third-order diffraction rays df3 as well as the ghosts G2 resulted from the second-order diffraction rays df2 will be distributed outside a center subject A1. The ghosts G4 resulted from the fourth-order diffraction rays df4 will be formed farther away from the image frame 10.

In the color separating optical system 12, indeed the number of ghosts superposed on the image frame 10 will increase as compared to the prior art shown in FIG. 4, but any ghosts will not overlap the center subject A1. That is, a consequent image will contain red spots as the ghosts in marginal positions around the center main subject A1, but the image of the center main subject A1 will be sharp and proper in color. This particular effect of the color separating optical system 12 may be achieved by the feature that the tilt angle α of the second dichroic film reflecting the red light component is at an intermediate value between the second-order diffraction angle and the third-order diffraction angle.

Because the tilt angle α of the second dichroic film corresponds to an angle α between the red light axis Pr and the virtual red light axis Prx in the developed view as shown in FIG. 2, the red light axis Prx may be located at an approximate center angle between the second-order diffraction ray df2 and the third-order diffraction ray df3 when the tilt angle α satisfies the condition: $\alpha \approx (\beta_2+\beta_3)/2$. As described above, since the reference wavelength of the red rays is 610 nm and the pixel pitch "d" of the image sensor 7R is 5 μm, the diffraction angles $\beta_2$ of the second-order diffraction ray df2 and the diffraction angle $\beta_3$ of the third-order diffraction ray df3 are 9.05° and 13.65°, respectively. According to these values, the tilt angle α of the second dichroic film of the color separating optical system 12 may be set at 11.35°.

It is possible to design the optical system 12 so as to dispose the center of the image frame of the image sensor 7R in between the first-order diffraction ray df1 and the second-order diffraction ray df2 by setting the tilt angle α of the second dichroic film at 6.78°. Likewise, the center of the image frame of the image sensor 7R may be disposed in between the third-order diffraction ray df3 and the fourth-order diffraction ray df4 by setting the tilt angle α at 16.00°. However, if the tilt angle α of the second dichroic film is too small, the red rays reflected from the second dichroic film will not totally reflected from the inner surface of the incidence surface of the second prism 4. In contrast, in order to increase the tilt angle α, the size of the second prism 4 must increase, which inevitably enlarges the whole scale of the color separating optical system 12. Consequently, setting the tilt angle α at 11.35° is optimal in the present embodiment, wherein the pixel pitch of the image sensor 7R is 5 μm.

Diffraction angles of the diffraction rays will increase with an increase in pixel pitch of the image sensor. Accordingly, intervals between the ghosts will increase with the pixel pitch. Therefore, if the tilt angle α of the second dichroic film satisfies the condition: $\alpha \approx (\beta m+\beta m+1)/2$, it is possible to design the color separating optical system 12 such that all ghosts will be provided outside the image frame 10. In many cases, the micro indent structure on the imaging surface of the image sensor forms a square matrix. Therefore, when the color separating optical system 12 is used in a posture where the drawing paper surface of FIG. 2 corresponds to a horizontal plane, the tilt angle α of the second dichroic film should be so determined that the ghost pattern shifts in the horizontal direction of the image frame. Also when the micro indent structure on the imaging surface of the image sensor has a pattern that will diagonally distribute the diffracted beams, it is possible to adjust the tilt angle α of the second dichroic film such that any particular order diffraction rays will not provide a ghost that overlaps a center subject in an image frame.

In the color separating optical system 12 shown in FIG. 2, even if incident light on the imaging surface of the blue image sensor 7B is diffractively reflected and the diffracted beams reenter the first prism 3 through its exit surface, the diffracted beams will not fall again on the image sensor 7B, because the full reflection surface or the incidence surface of the first prism 3 is perpendicular to the optical axis P, and the first dichroic film tilts to the incidence surface in the manner as described above.

It is of course possible to design the first dichroic film on the surface 3a of the first prism 3 to have such spectral characteristics that reflect the red light component and transmit other light components, and the second dichroic film on the surface 4a of the second prism 4 to have such spectral characteristics that reflect the blue light component and transmit other light components. In that case, the same problem as described above can occur with respect to the blue rays that exit from the second prism 4 and fall on the image sensor. Therefore, the tilt angle α of the second dichroic film should be adjusted according to the reference wavelength of the blue rays.

Although the present invention has been described with reference to the illustrated embodiment, the present invention is not to be limited to the above embodiment. For example, the present invention is applicable in combination with various kinds of image sensors that differ in size or in pixel pitch from each other. That is, adjusting the tilt angle α of the second dichroic film while considering the refractive index of the glass material of the second prims, the reference wavelength of the color light component that will cause the ghosts, and the pixel pitch of the image sensor, the color separating optical system of the present invention prevents the diffracted beams from forming ghosts in the center area of the imaging surface of the image sensor.

It should be understood that the embodiments of the present invention have been disclosed for illustrative purposes only. Those skilled in the art will appreciate that various modifications, additions and substitutions are possible without departing from the scope and spirit of the invention as disclosed in the accompanying claims.

What is claimed is:

1. A color separating optical system comprising:
a first prism having an incidence surface perpendicular to an optical axis of an objective lens, and a first dichroic film formed on a surface of the prism, the first dichroic film reflecting a first color light component and transmitting second and third color light components of light entering through the first incidence surface, wherein the first color light component reflected from the first dichroic film is emitted from the first prism to a first image sensor;
a second prism having an incidence surface accepting the light components as transmitted through the first dichroic film, and a second dichroic film formed on a surface of the prism, the second dichroic film reflecting the second color light component and transmitting the third color light component among the light components entering through the second incidence surface, wherein the second color light component reflected from the second dichroic film is totally and internally reflected within the second prism and then emitted from the second prism to a second image sensor; and
a third prism for emitting the third color light component as transmitted through the second dichroic film to a third image sensor, wherein
the second dichroic film tilts to a perpendicular plane to the optical axis of the objective lens at a tilt angle α that satisfies the condition: $\alpha \approx (\beta m + \beta m+1)2$, provided that $\beta m$ represents a diffraction angle of the second color light component diffractively reflected from the imaging surface of the second image sensor, and the diffraction angle $\beta m$ satisfies the following equation: $d \cdot n \cdot \sin(\beta m) = m \cdot \lambda$, wherein $\lambda$ represents a reference wavelength of the second color light component, d represents a pixel pitch of the second image sensor, n represents a refraction index of the second prism, and m is a natural number representative of an order of diffraction.

2. The color separating optical system as claimed in claim 1, wherein the first color light component is one of blue and red light components, whereas the second color light component is the other of blue and red light components.

3. The color separating optical system as claimed in claim 2, wherein an air gap is provided between the surface of the first prism having the first dichroic film formed thereon and the incidence surface of the second prism.

* * * * *